US006386372B1

United States Patent
Bouchain et al.

(10) Patent No.: US 6,386,372 B1
(45) Date of Patent: May 14, 2002

(54) PROCESS FOR RECYCLING WOODEN PALLETS AND INSTALLATION FOR PRACTICING SUCH A PROCESS

(76) Inventors: Alain Bouchain; Véronique Alliot, both of 97 avenue Victor Hugo, F-75016 Paris (FR)

( * ) Notice: Subject to any disclaimer, the term of this patent is extended or adjusted under 35 U.S.C. 154(b) by 0 days.

(21) Appl. No.: 09/628,433

(22) Filed: Jul. 28, 2000

(30) Foreign Application Priority Data

Jul. 30, 1999 (FR) .............................. 99 09923

(51) Int. Cl.⁷ ................................. B07C 5/00
(52) U.S. Cl. ...................... 209/1; 209/10; 209/630; 209/942; 414/928; 414/929
(58) Field of Search .............. 209/1, 10, 630, 209/702, 942, 3; 414/928, 929

(56) References Cited

U.S. PATENT DOCUMENTS

| | | | | |
|---|---|---|---|---|
| 4,462,746 A | * | 7/1984 | Smets | 414/795.4 |
| 5,096,369 A | * | 3/1992 | Ouellette | 414/788.7 |
| 5,564,879 A | * | 10/1996 | Noguchi | 209/1 X |
| 5,630,695 A | | 5/1997 | McDonnell | 209/630 X |

FOREIGN PATENT DOCUMENTS

| | | |
|---|---|---|
| DE | 43 08 580 | 9/1994 |
| EP | 0 249 402 | 12/1987 |
| SU | 1258693 | 9/1986 |
| WO | WO 99/04926 | 2/1999 |

* cited by examiner

*Primary Examiner*—Tuan N. Nguyen
(74) *Attorney, Agent, or Firm*—Young & Thompson

(57) ABSTRACT

Wooden pallets are recycled by carrying out a first separation in a reception region (10) between pallets easily reparable and those which are not, in directing the separated items to conveyors: one conveyor (11) which brings them to a disassembly station (20), and a second conveyor which brings them toward a repair station (30). The layers of the pallets are separated from each other by sawing in the disassembly station, so that all the constituent elements of the pallet are separated from each other. Sorting and recalibration of the elements thus separated is carried out in separating, sawing and planing stations (21, 22). The elements thus sorted and recalibrated are stored in a storage station (40) which extends along the installation. The damaged elements are then brought one by one to the repair station, and the sorted and recalibrated elements in the storage station (40) are brought by a distributor (60) located between the repair station (30) and the reconstruction station (50) so as to carry out replacement of the elements withdrawn from the repair station (30) or the reconstruction of new pallets.

8 Claims, 2 Drawing Sheets

PROCESS FOR RECYCLING WOODEN PALLETS AND INSTALLATION FOR PRACTICING SUCH A PROCESS

The present application corresponds to French application Serial No. 99.09923 filed Jul. 30, 1999, the disclosure of which is incorporated herein by reference.

FIELD OF THE INVENTION

The present invention relates to a process for recycling wooden pallets.

BACKGROUND OF THE INVENTION

Because of the widespread use of handling trucks, it has become common to place products or merchandise on wooden pallets. There are therefore millions in circulation, of all sorts and sizes. It frequently happens that they are more or less damaged or of an unmarketable size in that condition and a large quantity of pallets is discarded although they could be repaired or redimensioned, because their repair cannot be easily carried out, requiring a large amount of hand labor and hence too great a cost.

SUMMARY OF THE INVENTION

The process according to the invention consists in:
- carrying out manually a first sorting between pallets easily saleable after repair or truing, and those which must be completely disassembled; those which can be sold after repair or truing being deposited on a conveyor that brings them to a repair station and the others being deposited on another conveyor which brings them to a disassembly station;
- then in the disassembly station, cutting up each pallet by separating from each other by sawing the different layers constituting the pallet (border, cross-pieces, base, blocks, beams) such that all the elements will be separated from each other;
- then in a sorting station, sorting said separated elements as a function of their size, bringing them by sawing to a certain number of standard dimensions when they are too long, discarding those which are too greatly damaged; these operations being carried out automatically by robots provided with feelers and optical detectors;
- then storing in piles, by means of an automated conveyor, said elements as a function of their sizes;
- then using the elements thus stored either to repair damaged products in a repair station, or to reconstruct new pallets in a reconstruction station.

An installation for practicing the process according to the present invention is characterized by the following arrangements:

a) the repair station comprises: a truing by sawing station, in which the constituent elements of the pallet can be individually separated; as well as a sawing station in which the peripheral elements are cut without being disassembled from each other.

b) the disassembly station comprises a table provided with a plurality of sawing means traversed successively by the pallet in the course of disassembly.

c) the repair station and the reconstruction station are supplied by means for distributing products from the storage station.

d) preferably, the distribution means is disposed between the repair station and the reconstruction station and is supplied from the storage station, by automated conveyor means.

e) also preferably, a station for new products is disposed adjacent the distributor so as to make up a possible shortage of recycled elements.

BRIEF DESCRIPTION OF THE DRAWINGS

By way of example, and to facilitate understanding of the invention, there is shown in.

DETAILED DESCRIPTION OF THE INVENTION

Figure 1:
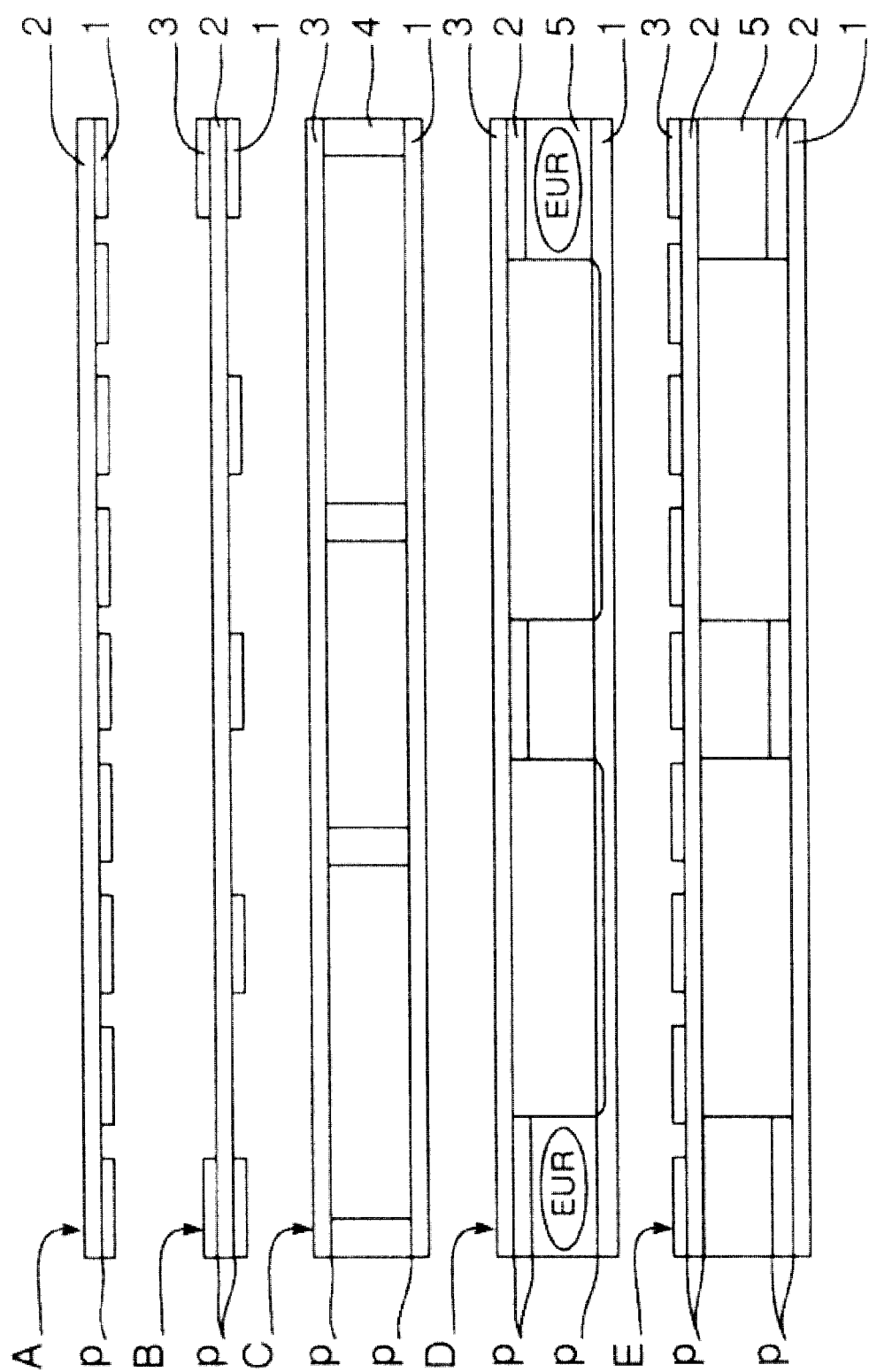
FIG. 1, a side elevational view showing the five most common types of pallets on the market.

FIG. 1 shows five types of products, known per se, envisaged by the invention, the products A and B being called "covers" and the products C, D and E being called "pallets".

Reference A designates what is called a two-layer cover, the lower layer being constituted by planks 1 disposed parallel at a certain distance from each other, this lower layer being covered with an upper layer, constituted by planks 2 disposed parallel to each other with a certain spacing, the planks 2 being perpendicular to the planks 1. The planks 1 are called "bases", the planks 2 being called "cross-pieces".

Reference B designates what is called a three-layer cover: the lower layer is constituted by bases 1, the intermediate layer by cross-pieces 2 and the upper layer by "borders" 3.

Reference C designates what is called a three-layer pallet. The lower layer is constituted by bases 1, the upper layer by cross-pieces 2; the spacing between these two layers, which determines the height of the pallet, is fixed by "beams" 4, which are arranged on edge.

Reference D designates what is called a four-layer pallet. The lower layer is constituted by bases 1; above these are disposed blocks 5; on the blocks 5 are disposed cross-pieces 2; and above the cross-pieces 2 are disposed borders 3.

Reference E designates what is called a five-layer pallet. The lower layer is constituted by bases 1; above the go bases 1 are disposed cross-pieces 2; above the cross-pieces 2 are disposed blocks 5; on the blocks 5 is disposed a second layer of cross-pieces 2; on these cross-pieces 2 are disposed borders 3.

All these elements: bases 1, cross-pieces 2, borders 3, beams 4, blocks 5 are fixed to each other by nailing or fastening, with metallic fasteners.

It will be seen that if there is passed in the plane p separating the two layers, the band of a band saw capable of sawing the nails and the fasteners, all the constituent elements of a pallet (or of a cover) namely: the base planks, cross-pieces or borders, as well as the beams or the blocks, are separated from each other.

One could therefore, if there are only one or two planks in the lower layer (base) or upper layer (border) that are damaged, repair the pallet (or cover) by detaching only the damaged element to replace it; but if the damaged elements are too numerous or located in intermediate layers, the repair is no longer possible.

Figure 2:
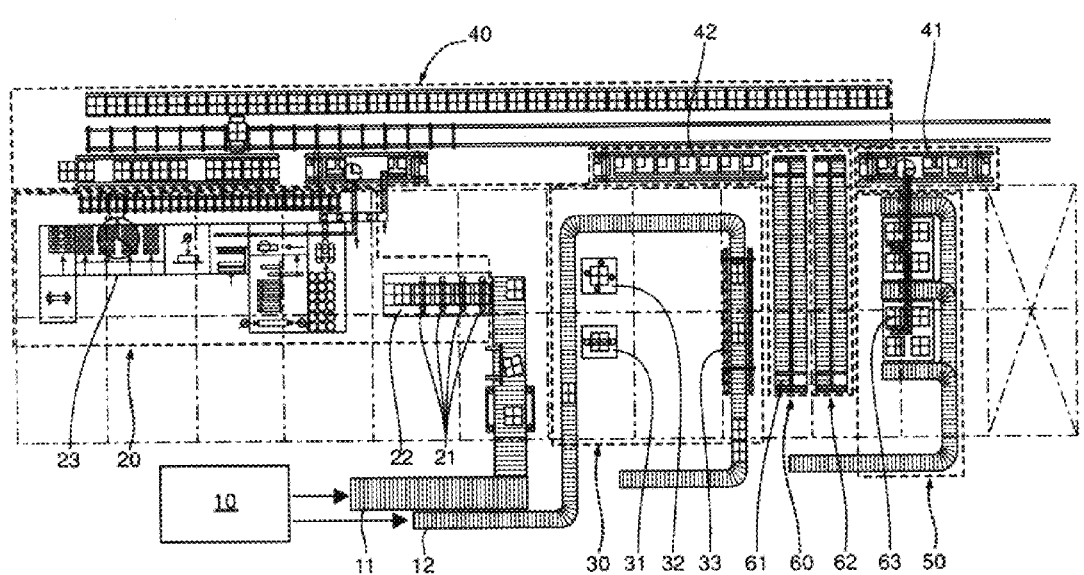
FIG. 2 a schematic plan of an installation for practicing process according to the invention.

Referring to FIG. 2, it will be seen that in a first station 10 the pallets and/or covers to be recovered are separated in two groups: a first group constituted by unmarketable products after repair or truing and a second group constituted of reparable products.

The first group is brought toward a conveyor 11, which directs the products to a disassembly station 20; the second group is moved by a conveyor 12 which directs the products to a repair station 30.

The dismantling or disassembly station 20 comprises a plurality of band saws 21 (four in the illustrated embodiment) which separate the layers from each other, such that at the outlet of the table 22 the pallets and/or covers will be entirely disassembled, the constituent elements comprising the planks, blocks or beams being separated from each other.

The separated elements arrive in a region 23 in which they are sorted as a function of their sizes and if desired returned to predetermined sizes by sawing.

Certain pallets can comprise borders 3 of an unusual thickness: these planks will be disassembled and replaced.

The elements thus sorted and returned to the desired dimensions are then stored in groups separated as a function of their sizes in a storage region 40.

This storage region extends over practically all the lateral length of the installation.

The repair station 30 adjoins the disassembly station 20.

It comprises a saw table 31 with a single band, the width of the band being less than the space separating two planks (base or border) such that the planks can be detached one by one.

This station also comprises a truing table 32 which permits eliminating markings that have become undesirable and cutting the peripheral elements without separating them from each other.

Then in region 33, the damaged elements are replaced which have been eliminated during passage over the table 31 either with trued elements 32 or with elements supplied by the conveyor 61 from the storage region 40.

Thus, this station 30 extends along the storage station 40, such that it is very easy to bring from the storage station 40 by means of the conveyor 60, toward the repair station 30, the replacement pieces.

The installation moreover comprises a station 50 for reconstruction of pallets from elements from the storage station.

Between the reconstruction station 50 and the repair station 30, is located a distributor device 60 which takes the elements stored in the storage station 40 and distributes them either to the repair station 30 by the conveyor 61 or to the reconstruction station 50 by the conveyor 62.

There can also be provided, in addition to the conveyors 61 and 62, a third conveyor 63 to supply the station 50 with new blocks.

There can also be disposed on either side of the distributor 60, additional storage regions 41 and 42 which are supplied with new elements so as to make up any possible shortage of repair elements.

The elements which are disassembled in the stations 20 and 30 and which are unusable, are sent to a crusher and the chips used in a steam generator.

The station 50 is provided with handling and storage means and nailing (or fastening) means used conventionally to produce pallets. It is supplied either with recovered elements stored in the station 40, or with new elements from the regions 41 and 42; in any case to reconstitute new pallets with recovered elements.

The process and installation according to the present invention promote the recovery of a large number of pallets which are at present abandoned or burned outside.

We claim:

1. A process for recycling wooden pallets, comprising the steps of:

carrying out a first sorting in a reception region of an installation, between pallets easily reparable and those which are not, and directing the sorted pallets toward two conveyors, namely, a conveyor which feeds a disassembly station and a second conveyor which feeds a repair station;

separating the layers of the pallets from each other by sawing in the disassembly station, whereby all the constituent elements of the pallet are separated from each other;

separating and recalibrating the elements thus separated by sorting and sawing;

storing the elements thus sorted and recalibrated in a storage station which extends along the installation;

taking off one by one the damaged elements in the repair station;

bringing by a distributor located between the repair station and a reconstruction station the sorted and recalibrated elements in the storage station so as to carry out replacement of the elements removed from the repair station or to carry out the reconstruction of new pallets; and discarding unsalable damaged elements by crushing and burning in a burner associated with a source of steam.

2. An installation for practicing the process according to claim 1, the installation comprising:

a sorting station;

a disassembly station;

a repair station;

a storage station; and a reconstruction station.

3. The installation according to claim 2, further comprising, at the outlet of the sorting station, a conveyor supplying the disassembly station and a conveyor supplying the repair station.

4. The installation according to claim 2, further comprising a distributor disposed between the repair station and the reconstruction station to supply elements serving for the repair or reconstruction of new pallets.

5. The installation according to claim 2, wherein the disassembly station comprises a table provided with a plurality of sawing means which separate the layers of the pallets from each other, in which all the elements are separated from each other.

6. The installation according to claim 4, further comprising means permitting sorting the elements as a function of their sizes and recalibrating them if necessary.

7. The installation according to claim 2, wherein the reconstruction station comprises means for producing pallets supplied with elements by the storage station.

8. The installation according to claim 2, further comprising at least one storage region for new elements to complete any shortage of recycled elements from the storage station.

* * * * *